United States Patent [19]

Cransac et al.

[11] Patent Number: 4,705,661
[45] Date of Patent: Nov. 10, 1987

[54] FAST NEUTRON NUCLEAR REACTOR EQUIPPED WITH A CENTRAL HANDLING CELL AND A BOXED SLAB

[75] Inventors: Jean-Pierre Cransac, Puyricard; Patrick Jogand, la Tour d'Aigues; Michel Sauvage, Aix en Provence, all of France

[73] Assignee: Electricite de France Service National, Paris, France

[21] Appl. No.: 739,683

[22] Filed: May 31, 1985

[51] Int. Cl.⁴ .............................................. G21C 13/00
[52] U.S. Cl. ..................................... 376/206; 376/263; 376/268; 376/271; 376/293
[58] Field of Search ............... 376/293, 206, 262, 265, 376/263, 264, 268, 271, 290; 414/146

[56] References Cited

U.S. PATENT DOCUMENTS

| | | | |
|---|---|---|---|
| 3,138,535 | 11/1958 | Fortescue | 414/146 X |
| 3,174,907 | 5/1960 | Bradley | 376/264 |
| 3,253,995 | 5/1966 | Antonsen | 414/146 X |
| 3,293,136 | 12/1966 | Harris | 376/264 |
| 4,056,435 | 11/1977 | Carlier | 376/264 |
| 4,087,325 | 5/1978 | Chevallier | 376/203 |

OTHER PUBLICATIONS

Nuclear News, vol. 15, No. 12, Dec., Hindsdale, Illinois, U.S.A., J. Brarnard et al.
Journal of the British Nuclear Energy Society, vol. 12, No. 4, Oct. 1973, London, G.B.
Westinghouse Engineer, vol. 31, No. 6, Nov. 1966, Pittsburgh, U.S.A., W. M. Jacobi.
Cend-200, vol. 1, Jan. 1964.
Kernenergie, vol. 12, No. 5, May 1969, Berlin (DE), A. E. Lejpunski et al.
Reactor Technology, vol. 13, No. 1, winter 1969-1970, Washington, U.S.A., L. J. Koch.

Primary Examiner—Frederick R. Schmidt
Assistant Examiner—Bradley I. Vaught

[57] ABSTRACT

A fast neutron nuclear reactor having a vessel filled with liquid metal and sealed in its upper part by a box slab having a central opening in which is placed a plug-cover-core overhanging the core of the reactor. The central opening is surmounted by a cell containing the handling and storage mechanism for the plug-cover-core and a mechanism for handling the assemblies. The latter can be moved on annular rails and can be collapsed against the wall of the cell, in order to permit the manipulation of the plug-cover-core. A radial passage connects the cell to a transfer station.

10 Claims, 6 Drawing Figures

FAST NEUTRON NUCLEAR REACTOR EQUIPPED WITH A CENTRAL HANDLING CELL AND A BOXED SLAB

BACKGROUND OF THE INVENTION

The present invention relates to an integrated liquid metal-cooled fast neutron nuclear reactor comprising a liquid metal-filled vessel, which is sealed in its upper part by a reinforced concrete boxed slab acting as a support for the exchangers and the pumps of the primary circuit.

In such reactors, the assemblies constituting the core rest on the bottom of the vessel or on the periphery thereof via a liquid metal (generally sodium) supply support and a flooring. The liquid sodium is heated in the core by the fission reaction of the nuclear fuel before entering a hot collector placed above the core and in heat exchangers, where it transfers its calories to the fluid (generally sodium) circulating in secondary circuits. The cold primary sodium leaving the cold collector located in the lower part of the exchangers is sucked in by primary pumps, which reinject it into the support. In this type of reactor, the exchangers and primary pumps are generally suspended on the slab sealing the reactor vessel. This is also the case with a certain number of other members necessary for the operation or safety of the reactor.

In reactors such as the Phénix or Super-Phénix, the assemblies are periodically removed from the core by a transfer arm or by pokers or rabbles mounted on rotary plugs, followed by discharging by means of a ramp and lock system into an adjacent storage enclosure, where they discharge their residual power for an adequate time to at least partly deactivate the same. They subsequently undergo processing for separating the canning material from the fuel for the purpose of recovering the latter.

This handling system is relatively complex and particularly in the case of fissile assemblies, it is made difficult to carry out by the presence of instrumentation which is suspended on the plug-cover-core.

French Pat. No. 7,131,036 filed on 26.1.1971 by the Commissariat à l'Energie Atomique and Creusot Loire proposed simplifying the handling system and facilitating its performance in the case of fissile assemblies, by equipping the reactor with a tight cell into which the plug-cover-core could be retracted, so as to free the top of the core for the passage of a handling arm.

The idea of a tight cell for the retraction of the plug-cover-core was also envisaged in British Pat. No. 1,026,559 filed by the U.K.E.A. and was previously investigated on a SEFOR reactor mockup in the USA (GEAP 5701, AEC Research and Development Report, March 1969).

However, the installation of a handling cell on the slab of an integrated fast neutron nuclear reactor has never been seriously considered, because it was generally believed that its construction would either lead to overdimensioning of the reactor and consequently to increased cost, or to a reduction in the power for constant dimensions. Moreover, the realization of this solution is only possible on a sufficiently rigid, strong slab and this is not the case with the mechanically welded slab of the Phénix and Super-Phénix reactors.

In addition, European patent publication No. 0058583 published Aug. 25, 1982 by the Commissariat à l'Energie Atomique proposed a very rigid, strong slab, with no significant increase in costs.

SUMMARY OF THE INVENTION

The present invention proposes an integrated nuclear reactor equipped with a boxed slab having a central box and a radial box made from reinforced concrete and in which are stored the handling and transfer means of the core assemblies.

More specifically, the present invention proposes a fast neutron nuclear reactor comprising a liquid metal-filled vessel, whose upper part is sealed by a reinforced concrete boxed slab having a lower plate with a central opening in which is located a plug-cover-core overhanging the reactor core and incorporating assemblies, as well as peripheral openings arranged in the form of a ring around the central opening, traversed by pumps and heat exchangers, whose heads are contained in recesses formed in the thickness of the slab, wherein the central opening is surmounted by a central handling cell, which can be linked with a transfer cell by at least one radial passage for discharging assemblies placed between two adjacent recesses and issuing directly into the central cell, the central cell and the radial passage being defined by reinforced concrete boxes constituting part of the boxed slab, handling and discharge means being provided for conveying the assemblies between the reactor core and the transfer cell, whilst passing through the central cell and the radial passage.

According to a first embodiment of the invention, the said handling and discharge means comprise a crane having a rotary plate and an inclinable Jib mounted so as to be movable on rails within said radial passage.

According to a second embodiment of the invention said handling and discharge means comprise a vertical beam mounted in such a way that it can be displaced in the central cell around the central opening and in the radial passage on at least one rail, said beam being pivoted about its own axis and slidingly supports a carriage on which a gripping arm is articulated about a vertical shaft.

In this case, the handling and discharge means can be collapsed between the box of the central cell by rotating the beam about its own axis and by rotating the gripping arm about said vertical shaft.

Preferably, handling means and storage means for the plug-cover-core are located in the upper part of the central cell at a level higher than that of the handling and discharge means for the assemblies.

The handling means of the plug-cover-core can more particularly comprise a system of chain or cable winches positioned above the central cell and controlling the vertical displacement of the plug-cover-core within the cell.

In the same way, the storage means of the plug-cover-core can comprise at least three retractable abutments installed in the box of the central cell in order to define a high position for the storage of the plug-cover-core.

BRIEF DESCRIPTION OF THE DRAWINGS

Numerous other features of the nuclear reactor in question will become apparent from the following description, particularly of several embodiments of transfer systems for the assembly, which are given in an indicative and non-limitative manner, with reference to the attached drawings, wherein show.

DETAILED DESCRIPTION OF THE PREFERRED EMBODIMENTS

Figure 1:
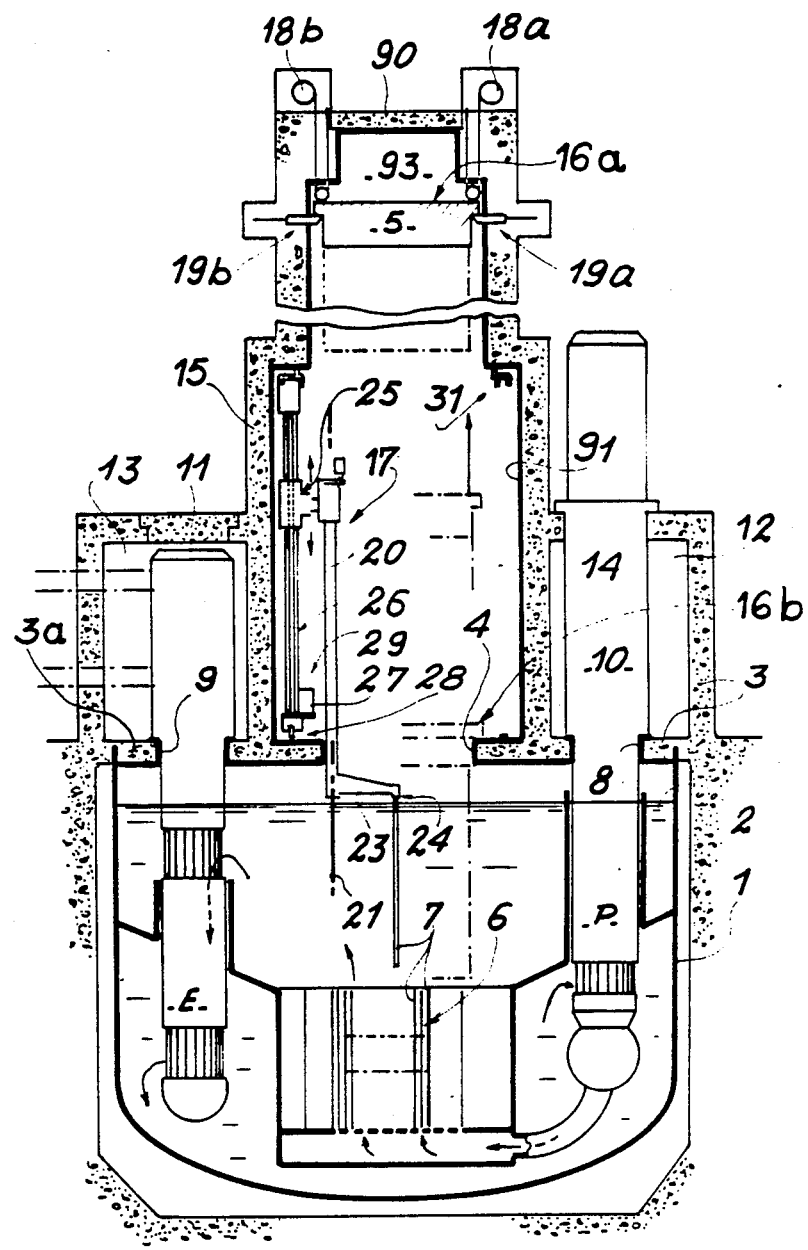
FIG. 1 a vertical sectional view of a nuclear reactor according to the invention having a handling cell integrated into the central shaft of the box slab.

The fast neutron nuclear reactor according to the invention comprises, in the manner illustrated in FIG. 1, a vessel 1 filled with liquid metal 2 (generally liquid sodium) and which is sealed in its upper part by a reinforced concrete boxed slab 3. The lower plate 3a of slab 3 has a plurality of openings, whereof one, 4, is central and the others 8, 9 are peripheral and arranged in ring-like manner around the central opening 4. The peripheral openings 8, 9 by which are respectively suspended at least one pump 10 and at least one heat exchanger 11 are surmounted by recesses 12, 13 made in the thickness of slab 3. These recesses are designed so as to enclose the heads of the pumps and exchangers. The central opening 4 overhangs the reactor core 6, formed from assemblies 7. Opening 4 is surmounted by a central, tight handling cell 14 defined by a reinforced concrete box 15, whose cylindrical side wall forms in its lower part the central shaft of slab 3.

According to the invention, the boxed slab 3 has no rotary plug and is instead merely provided with a plug-cover-core 5 located in the central opening 4 formed in lower plate 3a. The reinforced concrete handling box 15 can be duplicated on its inner face by a metal skin 91. It is closed at its apex by a detachable plug 90, which gives access to a lock 93, which enables reactor maintenance operations to be carried out.

There are two superimposed levels within cell 14, namely an upper level occupied by the storage and handling means for the plug-cover-core 5 and a lower level occupied by the handling and discharge means of assemblies 7.

Following the collapse or retraction of the handling means of the assemblies, the above system of levels permits the vertical displacement of the plug-cover-core 5 between an upper position 16a corresponding to its storage station during the handling phase and a lower position 16b, which it normally occupies during the operation of the reactor.

Among the handling means of the plug-cover-core 5 there is a system of winches 18a, 18b, operated by a chain or the like, mounted on the outer upper portion of box 15, for controlling the vertical displacement of the plug-cover-core 5 in cell 14.

The plug-cover-core storage means comprise a locking system ensured by at least three retractable abutments 19a, 19b located in the wall of cell 14 level with the upper position 16 of the plug-cover-core 5.

Figure 2:
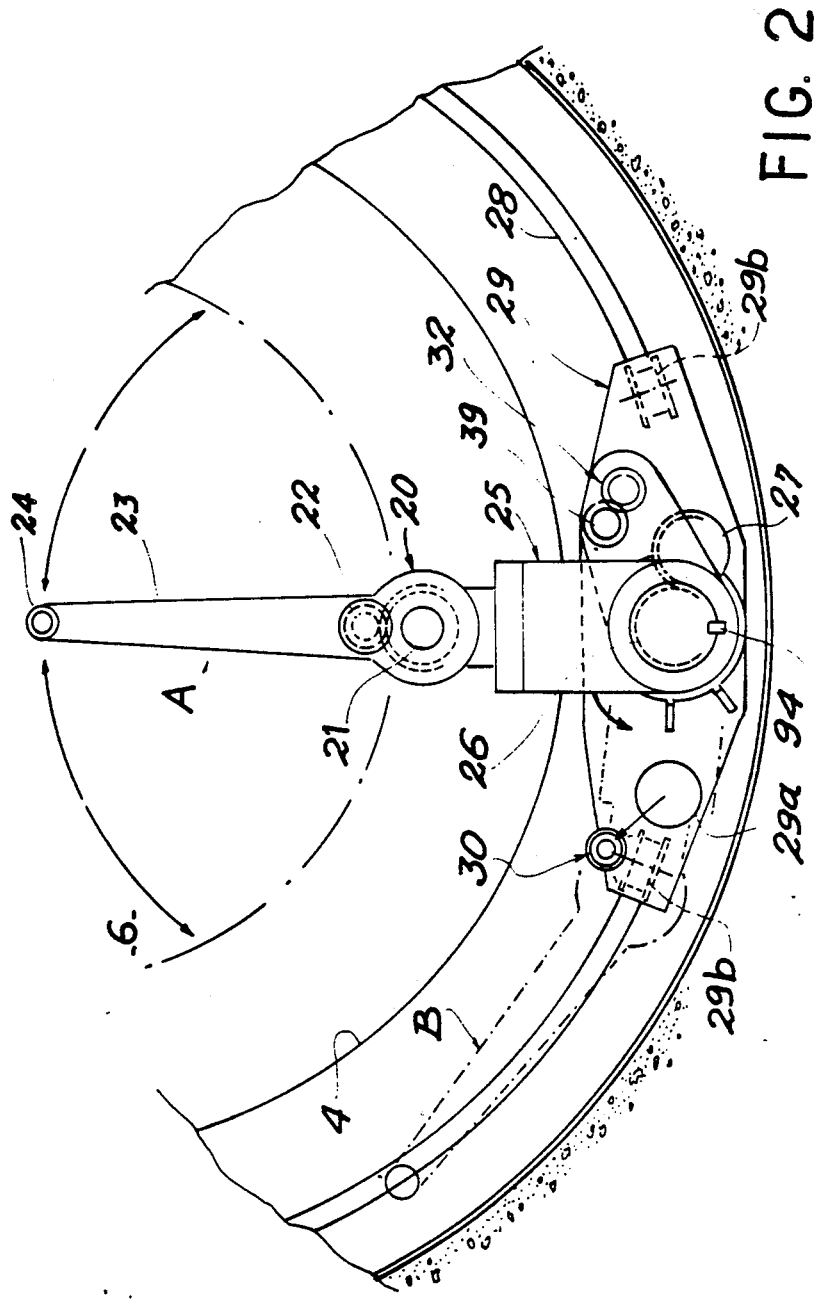
FIG. 2 a larger scale plan view showing a working position and the position corresponding to the collapsing against the wall of the handling cell of the members for handling the assemblies of the reactor according to FIG. 1.

As illustrated by FIGS. 1 and 2, the handling means 17 of assemblies 7, located in the lower part of cell 14, comprise a vertical arm 20 mounted so as to pivot about a vertical shaft 21, the pivoting of arm 20 about shaft 21 being controlled by a motor 22. At its lower end, arm 20 has a horizontal poker 23 which at its end is equipped with a grapnel 24 able to grasp assemblies 7. Shaft 21 is supported by a carriage 25, which slides along a vertical beam 26 via a threaded rod 39, which passes through the carriage 25 and is rotated by a control motor 32. Beam 26 is supported so as to pivot about its own axis by two carriages 29 equipped with rollers 29b rolling on at least two annular rails 28, 31. Rail 28 is located on the floor of cell 14, while rail 31 is positioned vertically above it in the upper part of the lower handling portion of cell 14.

The rotation of beam 26 about its own axis is controlled by a control motor 27. This rotation leads to the rotation of carriage 25 via a key 94. The displacement of carriages 29 along rails 28, 31 is controlled by a motor 29a via a bevel gear 30, which rotates one of the rollers 29b of the lower carriage 29. The structure described hereinbefore makes it possible to position the grapnel 24 of any random assembly 7 contained in core 6. It also makes it possible to completely free the access to the core and makes it possible to manipulate the plug-cover-core 5.

FIG. 2 shows at A and B two possible configurations of the aforementioned handling means for the assemblies. The continuous line configuration A represents one of the numerous configurations of the means during handling and in it grapnel 24 is in the center of reactor core 6. The mixed line configuration B illustrates the collapsing of said frame means against the wall of cell 14, which permits the vertical displacement of the plug-cover-core 5 along cell 14. The passage from configuration B to configuration A takes place by rotating beam 26 about its pivot axis and by rotating the arm 20 about its shaft 21.

Figure 3A:
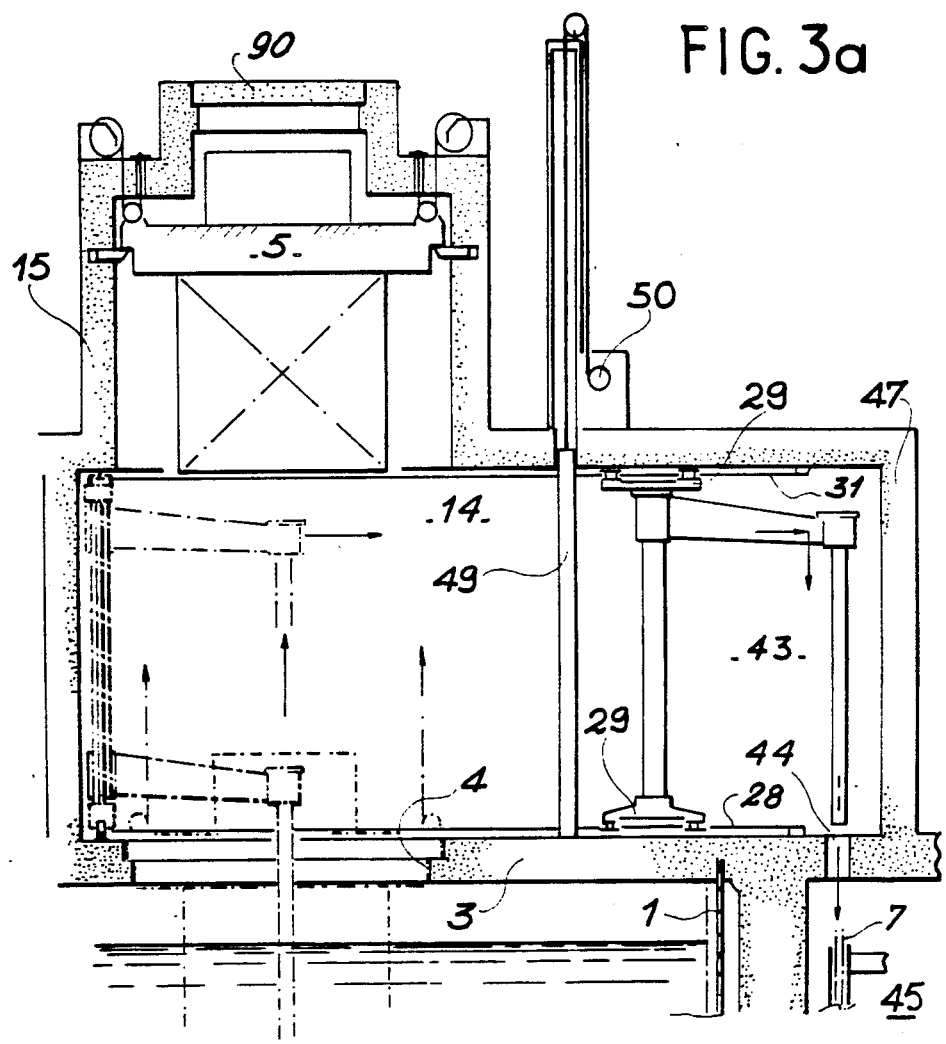
FIGS. 3a and 3b partial views in vertical section and in plan form of the nuclear reactor according to the invention, illustrating the first method for discharging assemblies to a secondary transfer station, said discharge being carried out by transfer means moving between the central cell and the radial transfer passage extending the same.
Figure 3B:
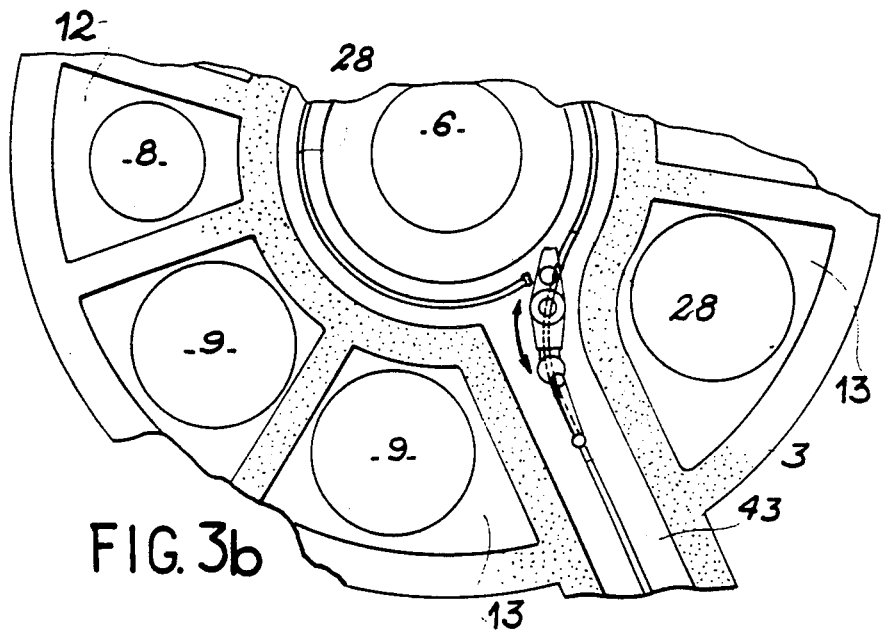

FIGS. 3a and 3b show the discharge of assemblies 7 to a transfer station in accordance with a first variant of the invention.

As is illustrated in FIGS. 3a and 3b, the assemblies 7 are discharged to an external transfer station 45 (FIG. 3a) by handling means located in cell 14. To this end, cell 14 is extended by a lateral or radial transfer passage 43, which is directly linked with cell 14 and is defined by a reinforced concrete box 47 integrated over at least part of its height with the box slab 3. Passage 43 is positioned radially between the two recesses 12, 13 formed in the peripheral part of the slab and its upper end is linked with transfer cell 45 by a discharge opening 44. As is more particularly illustrated in FIG. 3b, the transfer of assemblies between the core and the discharge opening 44 is carried out completely by the aforementioned handling means. To this end, rails 28 and 31 are extended within passage 43, in order to guide the carriages 29 throughout the displacement thereof. In operation, passage 43 is normally isolated from cell 14 by a door 49 manipulated by a winch 50.

The direct loading and unloading of the core through the central opening 4 of the plug-cover-core 5 has the advantage of significantly reducing the reactor height. Thus, there is no need to provide a height at least equal to the length and an assembly between the core and the slab, as in the case of conventional integrated reactors, in which the assemblies 7 are discharged by an inclined ramp. This configuration also has the advantage of not increasing the reactor diameter, because the transfer passage 43 only has a very limited width.

Figure 4A:
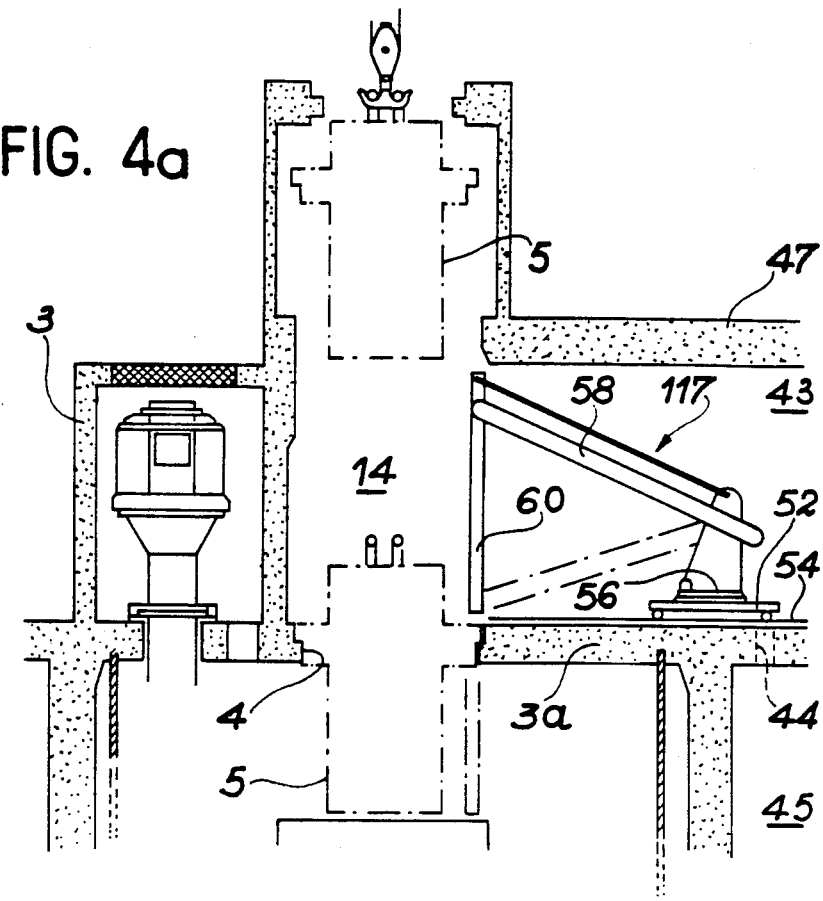
FIGS. 4a and 4b views comparable to FIGS. 3a and 3b illustrating the second method for discharging the assemblies using a crane, which is permanently positioned in the radial transfer passage.
Figure 4B:
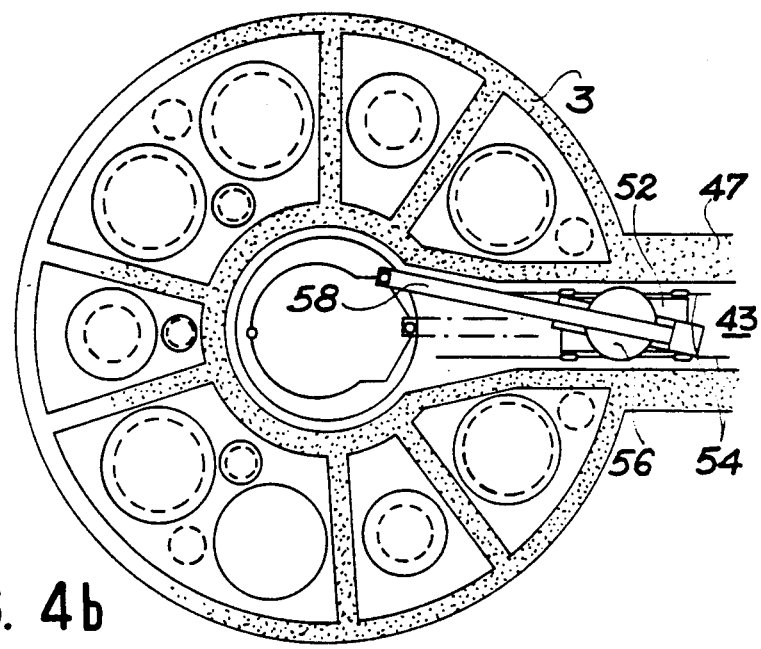

The variant shown in FIGS. 4a and 4b has the same advantages as the previous variant, because it also uses a lateral or radial discharge passage 43 linked directly with the handling cell 14 and defined by a reinforced concrete box 47 forming an integral part of the box slab 3. As in the previous variant, passage 43 radially traverses the slab between two of the recesses 12, 13 thereof, in order to link cell 14 with an external transfer cell 45 by a discharge opening 44.

The variant of FIGS. 4a and 4b differs from that of FIGS. 3a and 3b by the handling means, which are in this case constituted by a crane 117. This crame comprises a carriage or trolley 52 rolling on rails 54, which permits the radial displacement of the said carriage or trolley on the floor of box 47, which also constitutes the lower plate 3a of slab 3. Carriage 52 supports a rotary plate 56 on which an inclinable jib 58 is articulated about a horizontal axis. By a deformable parallelogram system, a guide tube 60 is mounted at the end of Jib 58, so that it remains in the vertical position, no matter what the inclination of the jib. A carriage carrying a grapnel moves within the guide tube, so that it grasps an assembly when it is in the bottom position (broken lines in FIG. 4a) and then retracts said assembly into the guide tube for moving it to the transfer cell. This is brought about by raising Jib 58 (continuous line in FIG. 4a), followed by the movement of carriage 52 along rails 54, in order to bring the guide tube 60 above opening 44 issuing into transfer cell 45. As is illustrated in FIG. 4b, the rotary plate 56 gives access to all the assemblies contained in the reactor core.

Obviously, it would be possible to provide two passages comparable to passage 43, in order to simultaneously carry out the discharge of used assemblies and the introduction of new assemblies.

What is claimed is:

1. A fast neutron reactor comprising: a liquid metal-filled vessel having an upper part, a reactor core, a reinforced concrete boxed slab sealing said upper part and having a lower plate with a central opening, a plug-cover-core located in said central opening and overhanging the reactor core and incorporating assemblies, said lower plate also having peripheral openings arranged in the form of a ring around the central opening, pumps and heat exchangers traversing said peripheral openings and having heads contained in recesses formed in the thickness of the slab, a central handling cell surmounting said central opening, at least one radial passage radially of, and linking said central cell with, a transfer cell adjacent thereto, for discharging assemblies placed between two adjacent recesses and issuing directly into said the central cell, said central cell and said radial passage being defined by reinforced concrete boxes constituting part of the boxed slab, and handling and discharge means for conveying said assemblies between said reactor core and said transfer cell, while passing through said central cell and said radial passage, said handling and discharge means comprising a vertical beam mounted so as to be displaceable in said central cell around said central opening and in said radial passage on at least one rail, said beam being pivotable about an axis thereof and slidingly supporting a carriage on which a gripping arm is articulated about a vertical shaft, said handling and discharge means being collapsable against said box of said central cell by rotating said beam about said axis thereof and by rotating said gripping arm about said vertical shaft.

2. A nuclear reactor according to claim 1, comprising handling means and storage means for said plug-cover-core located in an upper part of the central cell at a level higher than said handling and discharge means for the assembly.

3. A nuclear reactor according to claim 2, wherein said means for handling the plug-cover-core comprise a system of winches operated by a chain or the like, positioned above the central cell and controlling the vertical displacement of the plug-cover-core within the central cell.

4. A nuclear reactor according to claim 2, wherein said storage means of the plug-cover-core comprise at least three retractable abutments installed in the box on the upper part of the central cell, in order to define an upper storage position of the plug-cover-core.

5. A nuclear reactor according to claim 1, wherein the radial passage is linked with the transfer cell by at least one opening for the discharge of the assemblies.

6. A nuclear reactor according to claim 1, wherein the central cell is sealed by a detachable cover.

7. A fast neutron nuclear reactor comprising: a liquid metal-filled vessel having an upper part, a reactor core, a reinforced concrete boxed slab sealing said upper part and having a lower plate with a central opening, a plug-cover-core located in said central opening and overhanging the reactor core and incorporating assemblies, said lower plate also having peripheral openings arranged in the form of a ring around the central opening, pumps and heat exchangers traversing said peripheral openings and having heads contained in recesses formed in the thickness of the slab, a central handling cell surmounting said central opening, at least one radial passage radially of, and linking said central handling cell with, a transfer cell adjacent thereto, for discharging assemblies placed between two adjacent recesses and issuing directly into said central handling cell, said central handling cell and said radial passage being defined by reinforced concrete boxes constituting part of the boxed slab, and handling and discharge means for conveying said assemblies between said reactor core and said transfer cell, while passing through said central handling cell and radial passage, handling means and storage means for said plug-cover-core located in an upper part of the central handling cell at a level higher than said handling and discharge means for the assembly, said storage means of the plug-cover-core comprising at least three retractable abutments installed in the box on the upper part of the central handling cell, in order to define upper storage position of the plug-cover-core.

8. A fast neutron nuclear reactor comprising: a liquid metal-filled vessel having an upper part, a reactor core, a reinforced concrete boxed slab sealing said upper part and having a lower plate with a central opening, a plug-cover-core located in said central opening and overhanging the reactor core and incorporating assemblies, said lower plate also having peripheral openings arranged in the form of a ring around the central opening, pumps and heat exchangers traversing said peripheral openings and having heads contained in recesses formed in the thickness of the slab, a central handling cell surmounting said central opening, at least one radial passage radially of, and linking said central handling cell with, a transfer cell adjacent thereof, for discharging assemblies placed between two adjacent recesses and issuing directly into said central handling cell, said central handling cell and said radial passage being defined by reinforced concrete boxes constituting part of the boxed slab, and handling and discharge means for conveying said assemblies between said reactor core and said transfer cell, while passing through said central handling cell and said radial passage, handling means and storage means for said plug-cover-core located in an upper part of the central handling cell at a level higher than said handling and and discharge means for the assembly, said means for handling the plug cover-core comprising a system of winches operated by a chain or the like, positioned above the central handling cell and controlling the vertical displacement of the plug-cover-core within the central handling cell said storage means of the plug-cover-core comprises at least three retractable abutments installed in the box on the upper part of the central cell, in order to define an upper storage position of the plug-cover-core.

9. A nuclear reactor according to claim 7 or 8, wherein said handling and discharge means comprise a crane with a rotary plate and an inclinable jib mounted so as to be displaceable on rails within said radial passage.

10. A nuclear reactor according to claim 7 or 8, wherein said handling and discharge means comprise a vertical beam mounted so as to be displaceable in said central cell around said central opening and in said radial passage on at least one rail, said beam being pivotable about an axis thereof and slidingly supporting a carriage on which a gripping arm is articulated about a vertical shaft.

* * * * *